United States Patent [19]

Hagemeyer, Jr. et al.

[11] 3,857,903

[45] Dec. 31, 1974

[54] CONTINUOUS PROCESS FOR THE PREPARATION OF 2,5-DIMETHYL-2,4-HEXADIENE

[75] Inventors: Hugh John Hagemeyer, Jr.; Howard Nolan Wright, Jr., both of Longview, Tex.

[73] Assignee: Eastman Kodak Company, Rochester, N.Y.

[22] Filed: Oct. 18, 1972

[21] Appl. No.: 298,744

[52] U.S. Cl. .................... 260/681, 203/61, 203/70, 203/77
[51] Int. Cl. ............................... C07c 1/20
[58] Field of Search ..................... 260/681

[56] References Cited
UNITED STATES PATENTS

| | | | |
|---|---|---|---|
| 2,398,103 | 4/1946 | Long................................. | 260/681 |
| 2,957,929 | 10/1960 | DeLaMare........................ | 260/681 |
| 3,157,710 | 11/1964 | Hoyle et al. ...................... | 260/681 |

Primary Examiner—Paul M. Coughlan, Jr.
Attorney, Agent, or Firm—Edward R. Weber; C. D. Quillen, Jr.

[57] ABSTRACT

1,1,4,4-tetraalkyl-1,3-butadienes are prepared by the acid catalyzed cleavage and isomerization of a carboxylic acid ester having the formula

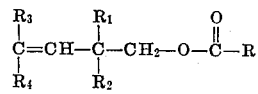

or

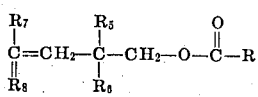

where R is an organic radical such that the product organic acid forms an azeotrope with the product 1,1,-4,4-tetraalkyl-1,3-butadiene, $R_1$ through $R_7$ are the same or different lower alkyl radicals, and $R_8$ is a lower alkylidene radical, in a process which comprises continuously contacting an acid catalyst at a temperature in the range of about 125°C. to about 250°C. with said carboxylic acid ester and subsequently continuously removing from the reactor an overhead stream comprising 1,1,4,4-tetraalkyl-1,3-butadiene and an organic acid, distilling said overhead stream in a first distillation column at a pressure of less than one atmosphere, removing therefrom a second overhead stream comprising 1,1,4,4-tetraalkyl-1,3-butadiene, distilling said second overhead stream at a pressure higher than that of the first distillation column and removing therefrom a bottoms stream comprising 1,1,4,4-tetraalkyl-1,3-butadiene, and distilling said bottoms stream also at a pressure higher than that of the first distillation column so as to obtain a stream of essentially pure 1,1,4,4-tetraalkyl-1,3-butadiene.

11 Claims, No Drawings

CONTINUOUS PROCESS FOR THE PREPARATION OF 2,5-DIMETHYL-2,4-HEXADIENE

This invention relates to a continuous process for the preparation of 1,1,4,4-tetraalkyl-1,3-butadienes. More particularly, this invention relates to the continuous preparation of 1,1,4,4-tetraalkyl-1,3-butadienes by the acid catalyzed cleavage and isomerization of a carboxylic acid ester having the formula

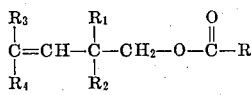

or

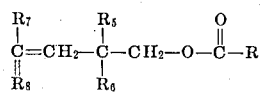

where R is an organic radical such that the product organic acid forms an azeotrope with the product 1,1,4,4-tetraalkyl-1,3-butadiene, $R_1$ through $R_7$ are the same or different lower alkyl radicals, and $R_8$ is a lower alkylidene radical.

The 1,1,4,4-tetraalkyl-1,3-butadienes, because of their unique properties, form a very valuable class of compounds and have a variety of uses, including, for example, use as chemical intermediates. They can be polymerized by known methods to form valuable polymers, as shown, for example, by U.S. Pat. No. 3,019,213, issued Jan. 20, 1962. Furthermore, the hydrogenation of 1,1,4,4-tetramethylbutadiene is a convenient route to the corresponding alkene or alkane. In addition, this particular compound can be used in the synthesis of chrysanthemic acid and the pyrethroids class of valuable insecticides which produce very rapid insect knockdown action with a very low mammalian toxicity.

U.S. Pat. No. 3,157,710, issued Nov. 17, 1964, describes a process for producing 1,1,4,4-tetraalkyl-1,3-butadienes, utilizing acid catalyzed cleavage and isomerization of carboxylic acid esters. In this process, crude tetraalkylbutadiene is distilled from the reaction mixture at a temperature of about 5°C. above the boiling point of the tetraalkylbutadiene, neutralized with 5% sodium hydroxide solution, washed with water, dried over anhydrous magnesium sulfate, and redistilled. No organic acid is recovered.

Although the process described in U.S. Pat. No. 3,157,710 can be used to produce 1,1,4,4-tetraalkyl-1,3-butadienes, it leaves much to be desired from a commercial standpoint. For example, it is particularly adapted for small batch-type operations, whereas, for economic reasons, it would be more desirable to scale up in size or better yet convert to a continuous process. Unfortunately, the process is difficult to scale up to a commercial batch process, and particularly difficult to adapt to an economical continuous process. In addition, economic and environmental considerations for such a process dictate that the carboxylic acid coproduct must be recovered and all other by-products be limited to those which may be used as fuel. Furthermore, an inexpensive system must be used to separate the acid from the tetraalkylbutadienes, and the use of basic neutralization agents and drying agents must be eliminated or held to a minimum. Thus, it can be seen that the development of a continuous process for producing tetraalkylbutadienes having these desirable characteristics would represent a substantial step forward in the art.

Accordingly, it is an object of this invention to provide a process for the continuous preparation of 1,1,4,4-tetraalkyl-1,3-butadienes.

Another object of this invention is to provide a continuous process for the preparation of 1,1,4,4-tetraalkyl-1,3-butadienes wherein the by-product organic acid may be recovered.

Still another object of this invention is to provide a process for the production of 1,1,4,4-tetraalkyl-1,3-butadienes wherein the use of basic neutralization agents and drying agents is held to a minimum.

Yet another object of this invention is to provide a continuous process for the production of 1,1,4,4-tetraalkyl-1,3-butadienes wherein the quantity of nonconsumable waste products is held to a minimum.

Other objects and advantages of the present invention will become apparent from an examination of the following specification and claims.

In accordance with the present invention, it has been found that 1,1,4,4-tetraalkyl-1,3-butadienes can be continuously produced by a process which comprises the steps of:

1. continuously feeding a carboxylic acid ester having the formula

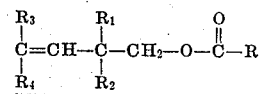

or

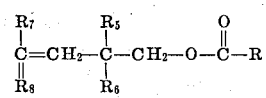

where R is an organic radical such that the product organic acid forms an azeotrope with the product 1,1,4,4-tetraalkyl-1,3-butadiene, $R_1$ through $R_7$ are the same or different lower alkyl radicals, and $R_8$ is a lower alkylidene radical, and an acid catalyst into the base of a reactor operated at a temperature of from about 125°C. to about 250°C;

2. continuously removing from said reactor a first overhead stream comprising 1,1,4,4-tetraalkyl-1,3-butadiene and an organic acid having the formula

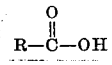

wherein R is as previously defined;

3. feeding said overhead stream into a distillation column operated at a pressure of less than one atmosphere, and removing therefrom a second overhead stream comprising 1,1,4,4-tetraalkyl-1,3-butadiene and a bottoms stream comprising said organic acid;

4. feeding the overhead stream from the first distillation operation into a second distillation column, which column is operated at a higher pressure than the first distillation column, and removing therefrom a bottoms stream comprising 1,1,4,4-tetraalkyl-1,3-butadiene and an overhead stream consisting of low boiling impurities; and 5. feeding said second bottoms stream into a third distillation column operated at higher pressure than the first distillation column, and removing from said third distillation column a stream of essentially pure 1,1,4,4-tetraalkyl-1,3-butadiene from a vapor take-off located near the bottom of said third distillation column.

The carboxylic acid esters used in this invention can be prepared by any methods known to those skilled in the art to be effective for this purpose. For example, they can be prepared in good yields by thermally cracking the diesters of the appropriate 1,3-diol. Using this procedure, carboxylic acid esters having ethylenic unsaturation in the 3- or 4- position are obtained in isomeric mixtures from which each of the esters can be separated using techniques known to be useful for this purpose. U.S. Pat. No. 2,941,011, issued June 14, 1960, discloses the preparation of 2,2,4-trimethyl-3-pentenyl esters utilizing the aforementioned technique. The higher molecular weight esters can be prepared using similar conditions as is obvious to those skilled in the art. For use in the process of this invention, it is unnecessary that a blend of esters having unsaturation in the 3- or 4- position be separated as the cleavage and isomerization reaction will convert both esters into the same substituted butadiene.

Numerous mono- and polycarboxylic acids which can be employed to form the carboxylic acid esters employed in this invention are known in the art. Thus, any of the aromatic, aliphatic or alicyclic carboxylic acids can be employed. Accordingly, R in the above formulas, although preferably an aryl, alkyl or cycloalkyl radical, desirably containing up to about 20 carbon atoms, can be any functional organic radical. Generally, however, the organic radicals containing only carbon, hydrogen and oxygen have been found to be the most satisfactory. Suitable acids for this purpose, therefore, include acetic acid, propionic acid, butyric acid, isobutyric acid, valeric acid, caproic acid, benzoic acid, cyclohexanecarboxylic acid, and the like. Preferred acids are the lower molecular weight aliphatic monocarboxylic acids such as, for example, those in which the acyl radicals in the above formulas contain 1-8 carbon atoms. The acid employed to form the carboxylic acid esters employed in the practice of this invention can contain one or more substituents or groups. However, as will be obvious to those skilled in the art, specific substituents or groups should be such that they do not substantially affect the process in an adverse manner when the carboxylic acid esters are employed in practicing this invention.

As previously indicated, $R_1$, $R_2$, $R_3$, $R_4$, $R_5$, $R_6$ and $R_7$ in the above formulas can be the same or different lower alkyl radicals. The term "lower alkyl" as used herein and in the attached claims, means a straight or branched chain saturated hydrocarbon radical having from 1 to 8 carbons. These lower alkyl radicals desirably contain 1-4 carbon atoms. Suitable lower alkyl radicals include, for example, methyl, ethyl, propyl, butyl, isobutyl, and the like. In contrast, $R_8$ is a lower alkylidene radical of from 1-8 carbon atoms, as exemplified by methylene, ethylidene, propylidene, isobutylidene, and the like.

The acid catalysts employed in the practice of this invention form a well-known class of catalysts, including, for example, organic and inorganic acids and salts of these acids with weak bases. These acid catalysts are more fully described in U.S. Pat. No. 3,157,710. The organic acid catalysts are exemplified by aromatic and aliphatic sulfonic or phosphonic acids such as, for example, benzene, toluene, or naphthalene sulfonic and phosphonic acids, or low molecular weight alkane mono- and disulfonic acids. Organic acids and their salts are preferably employed in the practice of this invention. However, inorganic acids will give good results and such acids are exemplified by sulfuric, phosphoric, or hydrochloric acids, as well as salts of those acids in weak bases. It is also possible to employ the Lewis acids such as, for example, boron trifluoride, aluminum trichloride, zinc chloride, and the like, in the practice of this invention. Lewis acids, however, are not as effective as the other acids previously mentioned. Preferred acid catalysts are those which are relatively nonvolatile and consequently remain in the reactor.

Reaction temperatures in the range of from about 125°C. to about 250°C. are generally employed in the practice of this invention. The preferred temperatures are generally those in the range of from about 140°C. to about 160°C., although under some circumstances lower or higher temperatures may be preferred. Generally, speaking, however, little or no reaction will occur at temperatures below 125°C. and excessive decomposition and/or isomerization will occur at temperatures above 250°C. Under these reaction conditions, catalyst concentration is subject to wide variations, however, catalyst concentrations in the range of about 0.1% to about 10% and preferably about 1% to about 5% by weight, based on the ester, give good results. The higher temperatures and catalyst concentrations will generally result in shorter reaction times, while lower temperatures and lower catalyst concentrations generally result in longer reaction times.

The reaction products should be removed from the reactor as they are produced. A particularly effective method is to distill out a mixture comprising a substituted diene and by-product organic acid as the reaction proceeds. The reaction is not particularly dependent upon any specific pressure conditions, and therefore atmospheric, elevated, or reduced pressures can be employed. The elevated pressure employed, if any, is usually only sufficient to maintain the reaction mixture in liquid form when a diluent is employed. Where a diluent is employed, it can be an aliphatic alkane or cycloalkene such as pentane, hexane, heptane, or cycloheptane, a hydrogenated aromatic compound such as tetralin or decalin, a higher molecular weight liquid paraffin or mixture of paraffins which are liquid at the reaction temperatures, or an aromatic hydrocarbon such as benzene, toluene, xylene, or the like. The nature of the diluent is subject to considerable variation, although it should be liquid under the conditions of the reaction, and relatively inert. Other diluents which can be used include any off the well-known inert liquid hydrocarbons such as octane, isooctane and the like.

The novel process of the instant invention is further characterized in that the carboxylic acid ester and sufficient makeup acid catalyst so as to maintain the desired concentration in the reactor are fed continuously into a reactor where the ester is cleaved and isomerized. A crude reaction product comprising 1,1,4,4-tetraalkyl- 1,3-butadiene and an organic acid of the type previously mentioned, is continuously removed from the reactor, preferably by distillation. This crude reaction product is then fed continuously into a primary acid removal distillation column operated at a reduced pressure, preferably operated at a pressure of less than about 300 mm Hg, where a concentrated stream of 1,1-,4,4-tetraalkyl-1,3-butadiene is distilled overhead and an essentially pure stream of the organic acid is removed as a bottoms stream. Lower pressure in this primary acid column yields higher purity in the overhead stream. A preferred pressure is the lowest pressure at which the overhead stream can be condensed using available cooling material. The overhead stream of impure 1,1,4,4-tetraalkyl-1,3-butadiene from this first distillation is then fed continuously into a second distillation column, operated at or near atmospheric pressure, where low boiling impurities are removed as an overhead stream and an impure stream of 1,1,4,4-tetraalkyl-1,3-butadiene is removed continuously as a bottoms stream. The impure bottoms stream is then fed to a third distillation column operated at or about atmospheric pressure, wherein the remaining organic acid impurities are distilled overhead and essentially pure 1,1,4,4-tetraalkyl-1,3-butadiene is withdrawn continuously as a vapor stream near the bottom of the distillation column.

It is unexpected that the 1,1,4,4-tetraalkyl-1,3-butadiene can be separated from the by-product organic acid by a simple distillation, since they form a constant boiling mixture or azeotrope. It is completely unexpected that the concentration of the azeotrope will vary sufficiently with pressure so that a satisfactory separation can be accomplished in commercial distillation equipment.

In a preferred embodiment of the invention, 2,2,4-trimethyl-3-pentenyl isobutyrate and/or 2,2,4-trimethyl-4-pentenyl isobutyrate is fed to the reactor in the presence of an acid catalyst such as p-toluenesulfonic acid. An overhead stream comprising 2,5-dimethyl-2,4-hexadiene and isobutyric acid is removed from the reactor. The azeotrope formed by the 2,5-dimethyl-2,4-hexadiene and isobutyric acid varies from 0.56% isobutyric acid at a distillation pressure of 13 mm mercury, to 8.3% isobutyric acid at atmospheric pressure. Distillation of the crude reaction product at a pressure between 13 mm and 35 mm mercury provides a stream of 2,5-dimethyl-2,4-hexadiene as an overhead product which contains less than 1% of isobutyric acid. The base product from this distillation column is at least 99% pure isobutyric acid, which by-product stream is adequate for most esterification reactions and the like.

The invention can be further illustrated by the following examples of preferred embodiments, although it will be understood that these examples are included merely for purposes of illustration, and are not intended to limit the scope of the invention.

EXAMPLE 1

This example provides a description of the continuous process for the production of 2,5-dimethyl-2,4-hexadiene.

A 3-liter reactor which is connected to a 20-plate distillation column is charged with 750 ml. of isobutyric acid, 1,750 ml. of 2,2,4-trimethyl-3-pentenyl isobutyrate and 22 grams of paratoluenesulfonic acid catalyst. The initial feed mixture is heated to its boiling temperature and the distillation column is maintained on total reflux until the base or reaction temperature is below 160°C. Overhead take-off from the one-inch diameter, 20-plate reactor-distillation column is then started at a 5:1 reflux ratio. The rate of overhead take-off is adjusted to maintain the base temperature at 160°C. and continuous feed is started. Typical feeds to the 3-liter reactor comprise 115.7 grams per hour of 2,2,4-trimethyl-3-pentenyl isobutyrate and 0.38 grams per hour of paratoluenesulfonic acid catalyst. Overhead temperature on the reactor-distillation column averages 135°C. and the overhead product averages 108 grams per hour of a product comprising 2.2 percent 2,2,4,4-tetramethyltetrahydrofuran, 2.8 percent isomers of 2,5-dimethyl-2,4-hexadiene, 50.5 percent 2,5-dimethyl-2,4-hexadiene and 44.5 percent isobutyric acid. Reactor base sludge is 100 ml. for each 168 hours of operation.

Reactor-column overhead product and 26 grams per hour of recycle material are fed into a primary acid separation column. This 2-inch diameter, 50-plate column is operated at 35 mm Hg pressure to separate 2,5-dimethyl-2,4-hexadiene from most of the isobutyric acid. Reflux ratio is maintained at 10:1 and temperatures along the column average 48°C. at the top, 70°C. at the middle and 82°C. in the base heater. Overhead take-off averages 88 grams per hour of the crude 2,5-dimethyl-2,4-hexadiene which contains one percent isobutyric acid. Base overflow averages 47.9 grams per hour of more than 99 percent pure isobutyric acid.

Overhead product from the primary acid separation column is fed into a low boiler column. This one-inch diameter, 80-plate column is operated at atmospheric pressure to separate low boiling isomers and tetramethyltetrahydrofuran from 2,5-dimethyl-2,4-hexadiene. Reflux ratio is maintained at 19:1 and temperatures along the column average 121°C. at the top, 135°C. at the middle, and 145°C. in the base heater. Overhead take-off averages 6.5 grams per hour of a mixture comprising 46.2 percent isomers of 2,5-dimethyl-2,4-hexadiene, 36.9 percent 2,2,4,4-tetramethyltetrahydrofuran, 15.4 percent 2,5-dimethyl-2,4-hexadiene, and 1.5 percent isobutyric acid.

Base overflow from the low boiler column is fed into a secondary acid separation column. This one-inch diameter 60-plate column is operated at atmospheric pressure to separate residual isobutyric acid from the product. Reflux ratio is maintained at 15:1 and temperatures along the column average 133°C. at the top, 136°C. in the middle, and 138°C. in the base heater. Overhead product averages 26 grams per hour of a mixture comprising 3.9 percent isobutyric acid and 96.1 percent 2,5-dimethyl-2,4-hexadiene. This overhead product is recycled to feed the primary acid separation column. Vapor take-off from the fifth plate (from the bottom) is condensed at the rate of 53 grams per hour and the material is at least 99.9 percent 2,5-dimethyl2,4-hexadiene.

Overall weight accountability averages 93 percent. Typical yields are 82.5 mole percent to refined 2,5-dimethyl-2,4-hexadiene and 93 mole percent of isobutyric acid.

EXAMPLE 2

The reactor is operated exactly as in Example 1. The primary acid separation column is operated at 175 mm mercury pressure and 10:1 reflux ratio. Temperatures along the column average 82°C. at the top, 98°C. at the middle, and 118°C. in the base heater. Feed to this column averages 109 grams per hour of reactor overhead product and 91 grams per hour of recycle from the secondary acid column. Overhead take-off averages 152 grams per hour of crude 2,5-dimethyl-2,4-hexadiene which contains 2.5% isobutyric acid. Base overflow averages 47.9 grams per hour of isobutyric acid with an assay of at least 99%.

The low-boil column and the secondary acid separation column are operated exactly as in Example 1. Overhead product from the secondary acid column averages 91 grams per hour of crude 2,5-dimethyl-2,4-hexadiene which contains 3.9% isobutyric acid. Vapor take-off from the fifth plate is condensed at 54 grams per hour to produce greater than 99.9% pure 2,5-dimethyl-2,4-hexadiene.

Overall weight accountability averages 93%. Yields are 84 mole percent to refined 2,5-dimethyl-2,4-hexadiene and 93 mole percent to refined isobutyric acid.

This example shows that the primary acid separation column should be operated at the lowest practical distillation pressure. The amount of recycle to the primary acid separation column is increased from 26 per hour to 91 grams per hour when the distillation pressure is raised from 35 to 175 mm mercury.

EXAMPLE 3

An isomeric mixture containing about 25% 2,2,4-trimethyl3-pentenyl isobutyrate and about 75% 2,2,4-trimethyl-4-pentenyl isobutyrate is prepared by dehydration of 3-hydroxy-2,2,4-trimethylpentyl isobutyrate in the presence of an acid catalyst.

The reactor is operated exactly as in Example 1, except for the difference in feed material. The primary acid separation column is operated at 35 mm mercury pressure and 10:1 reflux ratio. Temperatures along the column average 48°C. at the top, 70°C. at the middle, and 82°C. in the base heater. Overhead take-off averages 89 grams per hour of crude 2,5-dimethyl-2,4-hexadiene which contains one percent isobutyric acid.

The low boiler column and the secondary acid separation column are operated at atmospheric pressure, exactly as in Example 1. Vapor take-off from the fifth plate of the secondary acid column is condensed at the rate of 54 grams per hour to produce 99.9% pure 2,5-dimethyl-2,4-hexadiene.

Overall weight accountability averages 91%. Yields are 82 mole percent to refined 2,5-dimethyl-2,4-hexadiene and 95 mole percent to refined isobutyric acid.

Those skilled in the art will recognize that this continuous unit has the minimum amount of equipment for efficient operation of the process. The distillation columns in the purification train could contain different numbers of plates or operate at slightly different pressures and still be within the scope of this invention. One may add a continuous distillation column to produce low color isobutyric acid as an overhead product. The low-boiler column could be placed ahead of the primary acid column. One may substitute a short continuous distillation column for the vapor take-off line of the secondary acid column. One may also add an ion exchange bed to get acid content in the 2,5-dimethyl-2,4-hexadiene product to a few parts per million.

Other 1,1,4,4-tetraalkyl-1,3-butadienes can be produced by appropriate adjustments of temperature, pressure, etc., to correspond to differences in the characteristics of the feed ester.

The invention has been described in detail with particular reference to preferred embodiments thereof, but it will be understood that variations and modifications can be effected within the spirit and scope of the invention as described hereinabove.

We claim:

1. A process for the production of 2,5-dimethyl-2,4-hexadiene by the acid catalyzed cleavage and isomerization of 2,2,4-trimethyl-3-pentenyl isobutyrate and/or 2,2,4-trimethyl-4-pentenyl isobutyrate by contacting an acid catalyst at a temperature in the range of about 125°C. to about 250°C. with said carboxylic acid ester, the improvement which comprises the steps of:
   1. continuously feeding said carboxylic acid ester and said acid catalyst into the base of a reactor;
   2. continuously removing from the reactor a first overhead stream comprising 2,5-dimethyl-2,4-hexadiene and isobutyric acid;
   3. continuously feeding said first overhead stream into a first distillation column operated at a pressure of less than one atmosphere, and removing therefrom a second overhead stream comprising 2,5-dimethyl-2,4-hexadiene and a first bottoms stream comprising isobutyric acid;
   4. feeding said second overhead stream into a second distillation column, which column is operated at a pressure higher than that of the first distillation column and removing therefrom a third overhead stream consisting of low-boiling impurities, and a second bottoms stream comprising impure 2,5-dimethyl-2,4-hexadiene; and
   5. feeding said second bottoms stream into a third distillation column, which column is operated at a pressure higher than that of the first distillation column and removing from said third distillation column a stream of essentially pure 2,5-dimethyl-2,4-hexadiene from a vapor take-off line located near the bottom of said third distillation column.

2. A process according to claim 1 wherein the acid catalyst has a pH of no more than 3 when dispersed in water at a concentration of 1% by weight.

3. A process according to claim 1 wherein the acid catalyst is an aromatic sulfonic acid.

4. A process according to claim 1 in which the acid catalyst is an aliphatic sulfonic acid.

5. A process according to claim 1 wherein the acid catalyst is paratoluenesulfonic acid.

6. A process according to claim 1 wherein the carboxylic acid ester is 2,2,4-trimethyl-3-pentenyl isobutyrate.

7. A process according to claim 1 wherein the carboxylic acid ester is 2,2,4-trimethyl-4-pentenyl isobutyrate.

8. A process according to claim 1 wherein the first distillation column is operated at a pressure less than about 175 mm of Hg.

9. A process according to claim 8 wherein the first distillation column is operated at a pressure of from about 13 mm of Hg to about 35 mm of Hg.

10. A process according to claim 1 wherein the second distillation column is operated at substantially atmospheric pressure.

11. A process according to claim 1 wherein the third distillation column is operated at substantially atmospheric pressure.

* * * * *

UNITED STATES PATENT OFFICE
CERTIFICATE OF CORRECTION

Patent No. 3,857,903  Dated December 31, 1974

Inventor(s) H. J. Hagemeyer, Jr. and H. N. Wright, Jr.

It is certified that error appears in the above-identified patent and that said Letters Patent are hereby corrected as shown below:

In the abstract, delete the formula after "or" and insert

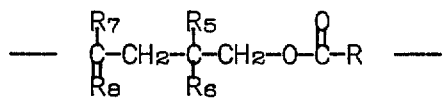

Column 1, lines 16-20, delete the formula after the word "or" and insert

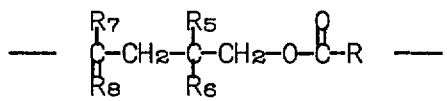

Column 2, lines 38-43, after the word "or" delete the formula and insert

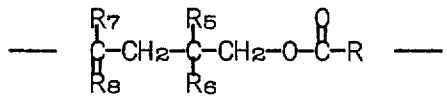

Column 7, line 30, after "26" insert ---grams---.

Signed and sealed this 13th day of May 1975.

(SEAL)
Attest:

RUTH C. MASON
Attesting Officer

C. MARSHALL DANN
Commissioner of Patents
and Trademarks